Oct. 23, 1934.   H. KLENCKE   1,977,767
ROTARY TUBE FURNACE FOR DESULPHURIZING ORES
IN A FINE OR DUSTLIKE CONDITION
Filed Oct. 18, 1932
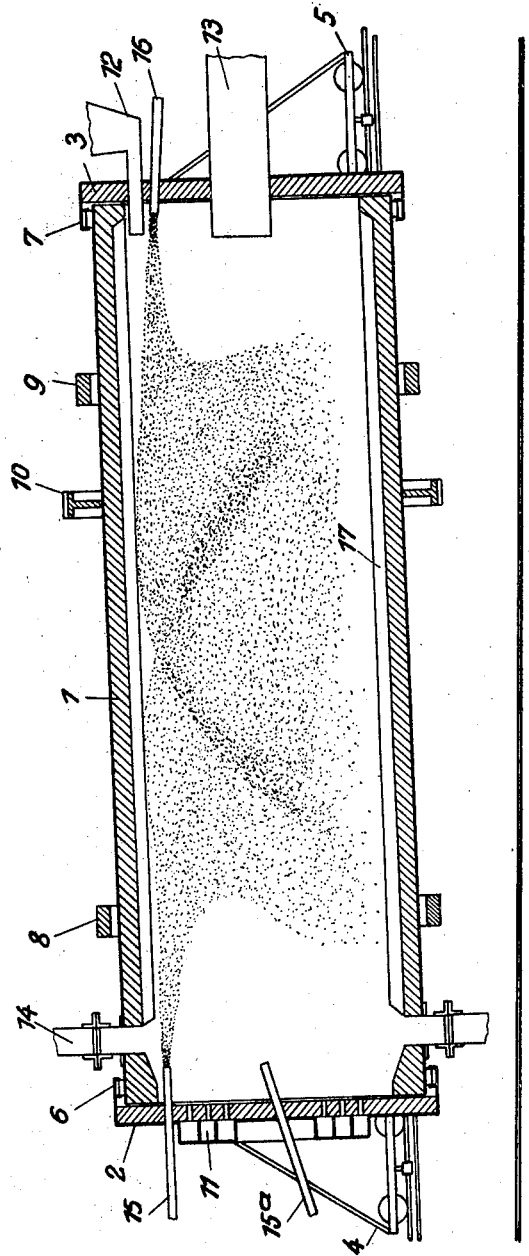

Patented Oct. 23, 1934

1,977,767

UNITED STATES PATENT OFFICE 1,977,767

ROTARY TUBE FURNACE FOR DESULPHURIZING ORES IN A FINE OR DUSTLIKE CONDITION

Hans Klencke, Frankfort-on-the-Main, Germany, assignor to American Lurgi Corporation, New York, N. Y., a corporation of New York Application October 18, 1932, Serial No. 638,366
In Germany October 26, 1931

12 Claims. (Cl. 75—60)

This invention relates to a rotary tube-furnace for desulphurizing ores in a fine or dustlike condition.

In roasting processes the quickest desulphurization of sulphides will be attained, if the sulphides are most intimately mixed with air. This phenomenon is demonstrated increasingly by comparison of various roasting methods carried out either with multiple stage roasting furnaces, or with sintering apparatus, such as Dwight-Lloyd apparatus, or with rotary tube furnaces, or, especially, with dissipating nozzles.

In all these cases the oxidizing action of the air is increased and the desulphurizing process accelerated in accordance with the degree in which the air is mixed with the sulphide.

The present invention provides a rotary tube-furnace, which answers these requirements in a high measure, and which therefore is particularly suitable for roasting zinc-blende, the dead-roasting of which in rotary tube-furnaces hitherto was considered to be impossible.

The invention includes making the inside diameter of the rotary tube-furnace larger than it was hitherto in use, i. e. more than 3 meters.

By increasing the inside diameter, more time is required for each single particle of sulphide charged to fall free through the open space of the furnace, and therefore the velocity of roasting is increased geometrically. Furthermore the proportion of the quantity of ore, for instance pyrites, which is suspended in the open furnace space, in comparison to the total ore charged, is raised by increasing the diameter of the furnace, which means a further increase of the furnace-capacity.

The larger the diameter of the rotary tube-furnace, the smaller is the possibility of slagging of the furnace-lining by local superheating, because to a great extent the roasting takes place within the free space of the furnace, and the larger cross-section of the furnace, by the increased number of square-meters of the surface, favours the cooling of the furnace-wall and lining.

The invention furthermore includes providing a larger number of inlet-holes for air at the end opposite the charging-end of the furnace. These holes are distributed in the end wall of the furnace, and may be arranged, for example, in concentric circles. In this manner the air is distributed into a large number of individual air-jets, which no longer mostly pass through the centre-line of the furnace as it is the case with a single air inlet placed in the centre of the end-wall, but they also pass along near the furnace-lining. Though the individual air-jets will not pass the whole furnace so equally distributed as they enter through the end-wall, yet the through distribution of the air into many jets at the entering-place has the advantage, that the oxygen of the air will be consumed equally over the whole furnace-section, thus diminishing the danger of air-oxygen, at certain places in detrimental excess, coming into contact with sulphide which is not yet sufficiently desulphurized, and thereby causing local superheating.

Sulphide mixed with air may be blown into the furnace at one or both end-walls. If for instance in roasting zinc-blende, an air-jet laden with ore-dust is introduced into the furnace through the end-wall at the discharge-end in such a manner, that this jet is maintained for a longer or shorter distance amongst the roast-air jets, before its ore-dust content is admixed with the furnace-gases and finally united with the bulk of the charge, the sulphur of the ore-dust blown into the furnace will be very quickly and completely oxidized. This blast acts in about the same manner as an additional burner provided in this part of the furnace. The raising of the temperature at the discharge-end of the furnace in such a way considerably improves the roasting of the rest of the material inside the furnace.

In some cases it may be of advantage to heat the charge very quickly up to roasting temperature at the charging end of the furnace. This may be attained in the same manner by blowing a mixture of ore-dust and air into the furnace at the end-wall of the charging end. There will then be an ore-dust air-jet in this place which for a certain part of the furnace-length moves in the opposite direction to the furnace-gases, until it is reversed in its flow and finally united with the furnace gases.

For obtaining an adequate amount of heat by these additional ore-dust air-jets, the ore-dust used for this purpose naturally must be present in a sufficiently fine-grained condition. For the bulk of the material that is to be roasted an equal fineness of grain is not necessary.

If additional ore-dust is blown into the furnace through one or both end-walls, it is advisable to have the end-walls made stationary. It is then possible to place the ore-dust nozzle into the top of the end-wall. A sufficiently long jet of ore dust and air may be obtained then already with a comparatively small quantity of blast-air. Naturally an equally long jet of blown dust may be attained by using air under higher pressure and nozzles inclined in an upward direction. These nozzles may be arranged centrally in an end-wall which is firmly connected with the furnace.

Roasting in a rotary tube-furnace supplemented by a blast of finely divided sulphide mixed with air according to the invention, is to be recommended especially in such cases, where materials are to be desulphurized whose caloric effect is only small, and with which particularly good results are attainable, if as high a temperature as possible can be maintained inside the furnace.

By the uniform rotary motion on the one hand, and by the steadiness of the air-current inside the furnace on the other, a uniform distribution of heat inside the whole furnace space is attained. Hereby it is possible, inside the furnace at the end opposite the charging end, to maintain temperatures high enough to prevent the formation of undesired chemical compounds, such as sulphates and ferrites. So it is possible by the present invention to discharge from the furnace roasted ore which is still in a hot condition, and thus to withdraw it from the noxious influence the furnace gases would have on it at lower temperatures.

Rotary tube-furnaces provided with a plurality of air-inlets at an end-wall are known, but the air that was blown into these furnaces was passed through the roasting charge. The known furnaces for this purpose were designed in such a manner, that the individual air-inlets were only placed close to the furnace shell, and that only those of the air-inlets were in operation, which at the time were covered with the roasting material under treatment inside.

The invention will be further illustrated by the accompanying drawing showing by way of example a longitudinal section of a rotary tube-furnace according to the invention.

1 is the furnace body, consisting in known manner of an iron shell lined with refractory material. 2 and 3 are the end-walls of the furnace. These are removable, being mounted on the waggons 4 and 5. They are stationary, while the furnace-body is rotating. Between the end-walls and the furnace-shell packings 6 and 7 are provided. Owing to the movable arrangement of the end walls, these are able to continuously yield to longitudinal changes of the furnace while in operation. The furnace is mounted on rollers 8 and 9 in the usual manner and is set into rotation by a driving gear and toothed ring 10. The air enters the furnace through the inlets 11 provided in the end-wall 2 and arranged in three or more concentric circles. The material to be roasted is charged into the furnace by the feeder 12, while the off-gases escape through the central flue 13 provided in the end-wall 3. 14 is the discharging arrangement provided with gates in a known manner. 15 and 16 are nozzles for the introduction of additional ore-dust air-jets. If desired the nozzles may be arranged at an angle upward, as designated on the drawing by way of example at 15a.

If zinc-blende is to be roasted, the inside diameter of the furnace will be made for example 4 meters, and the proportion of diameter to length of furnace may be chosen 1:10, as it is the case with the known cement-furnaces. It is however also possible to build the furnace shorter, for instance in proportion of 1:8 or 1:6. The zinc-blende, which may be reduced to a more or less fine grain, is charged into the furnace by the feeder 12 which is provided in the upper part of the end-wall 3, and in falling down it passes through the hot furnace-gases. The charge is continuously lifted up and showered back again into the free furnace space by the furnace-lining, which may be provided with turning-blades 17 or other known lifting means. The air is introduced into the furnace through the numerous inlets 11, which are particularly provided in a greater number in the end-wall 2 near the furnace-lining, thus contacting the latter uniformly and thoroughly with the air. In this manner the oxygen content of the air is consumed uniformly as it passes onward through the furnace. Hereby, and owing to the efficient heat-reflection, which is attained by the large diameter of the furnace, even in the furnace-section near the discharge 14 a sufficiently high temperature is kept up to allow a strong roasting reaction to proceed next to the discharge-device. Thus a thorough dead-roasting of the zinc-blende is attained. In case additional heating of the furnace near the discharge should be required, ore-dust is blown into the furnace through the nozzle 15 or 15a. If this ore-dust is of a sufficiently fine grain, its sulphur-content will be almost completely burnt before the ore-dust has reached the furnace-bottom. This quick combustion of sulphur considerably raises the temperature in that portion of the furnace in which the dust-jet is maintained. The roasted ore falling down from the ore dust-jet is mixed with the rest of the charge and thus also leaves the furnace through the device 14. A portion of the sulphur contained in the injected ore-dust may be oxidized by the air after the ore-dust has become mixed with the rest of the charge.

A similar ore-dust flame may be provided in the end-wall 3. In this case it is preferably placed closely below the feeder, so as to cause the zinc-blende being charged to fall through the ore-dust flame and cause it to be heated very quickly. The course of the dust-jets injected by the nozzles 15, 15a and 16 is indicated approximately by the curve shown in the drawing.

By carrying out the process of roasting zinc-blende with a rotary tube-furnace according to the invention a roasted ore is obtained, poor in sulphur, and suitable for the zinc reducing process.

I claim:

1. Rotary tube furnace for roasting finely divided sulphide characterized by having a ratio of furnace diameter to length of not less than 1 to 10, an inside furnace diameter of at least 3 meters, means in at least one end wall for blowing a stream of air and finely divided ore into the furnace, and a plurality of air-inlets in the end wall opposite the charging end, so positioned in the end wall that the air passes into the furnace in a plurality of parallel streams.

2. Rotary tube furnace for roasting finely divided sulphide characterized by having a ratio of furnace diameter to length of not less than 1 to 10, an inside furnace diameter of at least 3 meters, means at the upper part of at least one end wall of the furnace for blowing a stream of air and finely divided ore into the furnace and a plurality of air-inlets in the end wall opposite the charging end, so positioned in the end wall that the air passes into the furnace in a plurality of parallel streams.

3. Rotary tube furnace for roasting finely divided sulphide characterized by having a ratio of furnace diameter to length of not less than 1 to 10, an inside furnace diameter of at least 3 meters, means in the end wall of the furnace below the main charging inlet for blowing a stream of air and finely divided ore into the furnace and a plurality of air-inlets in the end wall opposite the charging end, so positioned in the end wall that the air passes into the furnace in a plurality of parallel streams.

4. Rotary tube furnace for roasting finely divided sulphide characterized by means in at least one end wall for introducing a finely divided sulphide in an aeroform stream into the furnace and means for withdrawing gases from the furnace in a direction countercurrent to the movement of solids therein.

5. Rotary tube furnace for roasting finely divided sulphide characterized by the provision of means in the upper part of at least one end wall for introducing into the furnace finely divided sulphide in an aeroform stream and means for withdrawing gases from the furnace in a direction countercurrent to the movement of solids therein, said furnace being further characterized in that it has sufficient size both as to length and as to diameter to accomplish substantial desulphurization of the finely divided charge while the latter is in flight.

6. Rotary tube furnace for roasting finely divided sulphide characterized by the provision of means at the upper part of at least one end wall for introducing a plurality of aeroform streams of the finely divided sulphide into the furnace and by the provision in the end wall of the furnace opposite the charging end of an air inlet, said furnace being further characterized by having sufficient size both as to length and as to diameter to accomplish the substantial desulphurization of the finely divided charge while in flight.

7. Rotary tube furnace for roasting finely divided sulphide characterized by the provision of means in the upper parts of both end walls for introducing aeroform streams of the finely divided charge into the furnace, means in one end wall for withdrawing furnace gases and means in the end wall opposite the gas discharging end and below the aforesaid means for introducing the aeroform charge for introducing a gas, said furnace being further characterized by having sufficient size both as to length and as to diameter to accomplish substantial desulphurization of the charge while in flight.

8. Process of roasting finely divided sulphide in a rotary tube furnace, which comprises introducing the sulphide into the upper part of one end of the furnace in a plurality of aeroform streams while maintaining within that part of the furnace a temperature at least equal to the desulphurization temperature, and withdrawing gases from the furnace at the same end as the sulphide is introduced.

9. Process as defined in claim 8 characterized in that the finely divided sulphide is introduced through an end wall of the furnace above a plurality of air streams whereby to effect the suspension of the finely divided sulphide and to increase the period of flight of the latter.

10. Process as defined in claim 8 characterized in that a stream of air is introduced at the end of the furnace opposite the gas-withdrawing end.

11. Process as defined in claim 8 characterized in that a stream of air carrying sulphide ore in the form of fine dust is introduced into the furnace in the end wall opposite the gas-withdrawing end.

12. Process as defined in claim 8 characterized in that the finely divided ore after its flight through the furnace atmosphere is raised and showered through the furnace atmosphere.

HANS KLENCKE.